United States Patent [19]
Robertson et al.

[11] Patent Number: 5,884,753
[45] Date of Patent: Mar. 23, 1999

[54] CONVEYOR SYSTEM

[75] Inventors: William B. Robertson, Rockwood; Rudy P. Rosa, Mississauga, both of Canada

[73] Assignee: Bi-Line Convertor Systems Limited, Ontario, Canada

[21] Appl. No.: 851,611

[22] Filed: May 5, 1997

[51] Int. Cl.⁶ .................................................. B65G 47/84
[52] U.S. Cl. ...................................... 198/803.2; 198/817
[58] Field of Search .................................... 198/817, 831, 198/465.2, 465.3, 803.2

[56] References Cited

U.S. PATENT DOCUMENTS

| | | | |
|---|---|---|---|
| Re. 30,791 | 11/1981 | Kupcikevicius | 198/341 |
| 1,476,939 | 12/1923 | Walden . | |
| 2,713,412 | 7/1955 | Douglass | 198/817 |
| 3,289,818 | 12/1966 | Kittredge | 198/831 |
| 4,230,223 | 10/1980 | Flajnik | 198/817 |
| 5,052,548 | 10/1991 | Andrews | 198/817 |
| 5,605,218 | 2/1997 | von Froreich | 198/465.2 |

*Primary Examiner*—Joseph E. Valenza
*Attorney, Agent, or Firm*—Kenway & Crowley

[57] ABSTRACT

A conveyor system for the transport of carriers such as trays in which the transport medium is two or more endless loops of round polycord, such as polyurethane belts, or cables, on which the trays are carried. In the drive system, the belts follow a figure-8 path and pass through the conveyor bed, are wrapped around a drive pulley driven by a reducer/motor, and return through the bed while maintaining continuous contact with the carriers. Corners on the conveyor bed are provided with mini-sheaves having partially open faces, around which the cables pass, the cables being of sufficient diameter to extend above the reduced diameter flange of the open-faced sheaves and remain in continuous contact with the bottom surface of the carriers.

1 Claim, 4 Drawing Sheets

CONVEYOR SYSTEM

BACKGROUND OF THE INVENTION

This invention relates in general to conveyor systems and in particular to a system using continuous unbroken loops of polyurethane belting travelling in parallel paths and supporting trays or other carriers of material.

The invention has its primary application in the food service industry, but obviously may be used in shipping, warehousing or other activities where it is necessary to move articles from one point to another for assembly, disposal, or other purpose.

Conveyor systems have long been used in the food service industry for such purposes as assembling meals on individual trays or for transporting soiled trays to a point where used items may be disposed of and utensils and dishes may be washed. Commonly, these systems are set up in generally looped configurations. Quite often, the loop is in the form of an oval and work stations may be set up along one or both of the long sides of the oval for the assembly of items on a food tray or, conversely, for the placement of trays of soiled items or their removal from the conveyor belt. In order to drive these conveyor systems, it was early the practice to use endless loops of chains which flex in the manner of a bicycle drive chain. These were driven by a drive motor with a sprocket which engaged the chain at a 180° turning point along the conveyor path. Trays or other carriers were attached at intervals to the chains. Because of their complexity, weight, and difficulty in maintaining sanitary measures, chain type drives were not satisfactory. Also, because it was necessary at times for the conveyor path to be curved in order, for example, to get around obstacles such as pillars, chain drives were abandoned in favor of belts or cables of flexible polymeric material. These belts at some point in their travel would be wrapped about a drive shaft from which they derived their motion.

Typical of a very early arrangement of conveyor utilizing generally parallel cables is that disclosed in U.S. Pat. No. 1,476,936. As the patentee notes, two cables are provided, and these form the moving mechanism of the conveyor and a receptacle containing the product may rest upon and be carried by the cables. Change of direction is accomplished by utilizing suitable sheaves around which the endless cables pass. At each corner that the conveyor belt turns, there are two independently rotating coaxial idler sheaves. The idler sheaves are of different diameters, but the cables are of equal length. By utilizing a constant speed and an even number of corners, containers of product may be carried along a plurality of paths from one point to another. However, because the two pulleys about which the cables pass are mounted vertically one above the other, one of the cables at the corners is higher than the other and containers carried by the cables are tilted as they turn the corner. This condition is inherently hazardous and especially not tolerable in a food-carrying operation where food will be spilled or otherwise displaced on carrier trays as corners are turned. Also, of course, the arrangement of vertically mounted sheaves is cumbersome and expensive and is not adaptable to conveyors having tortuous paths or odd numbers of corners.

OBJECTS OF THE INVENTION

It is an object of the present invention to provide a conveyor system useful in food service or other industries, particularly where a curved or tortuous path must be traversed by the containers.

Another object of the invention is to provide a conveyor system which has a drive system which is simply constructed and reliable in operation.

Yet another object of the present invention is to provide a conveyor system for the food service industry which is relatively light in weight yet durable in structure.

A further object is to provide an endless cable conveyor system in which carriers are maintained horizontal at all times and are continuously in contact with the driving cables.

SUMMARY OF THE INVENTION

The invention is organized about the concept of utilizing two parallel endless loops of cable which may follow any desired path and which are driven along a conveyor bed by a drive motor disposed at a point beneath the conveyor bed. Openings are formed in the conveyor bed for the passage of the cables. The trays or other carriers on the cable are in contact at all times with upper surfaces of the cables and are maintained in a horizontal orientation irrespective of the number of corners the path follows. By using appropriately disposed partially open-faced mini-sheaves mounted on the conveyor beds, the sheaves having upper flanges of reduced diameter, contact and driving force between the carriers and the cables is maintained continuously. By offsetting and shifting the axis of the drive motor relative to the path of the cables, drive for both cables is derived from a single shaft and no gap exists at the points of penetration of the conveyor bed by the cables.

For a better understanding of the present invention, together with other objects, features and advantages, reference should be made to the following description of a preferred embodiment which should be read in conjunction with the drawing in which:

PREFERRED EMBODIMENT OF THE INVENTION

Figure 1:
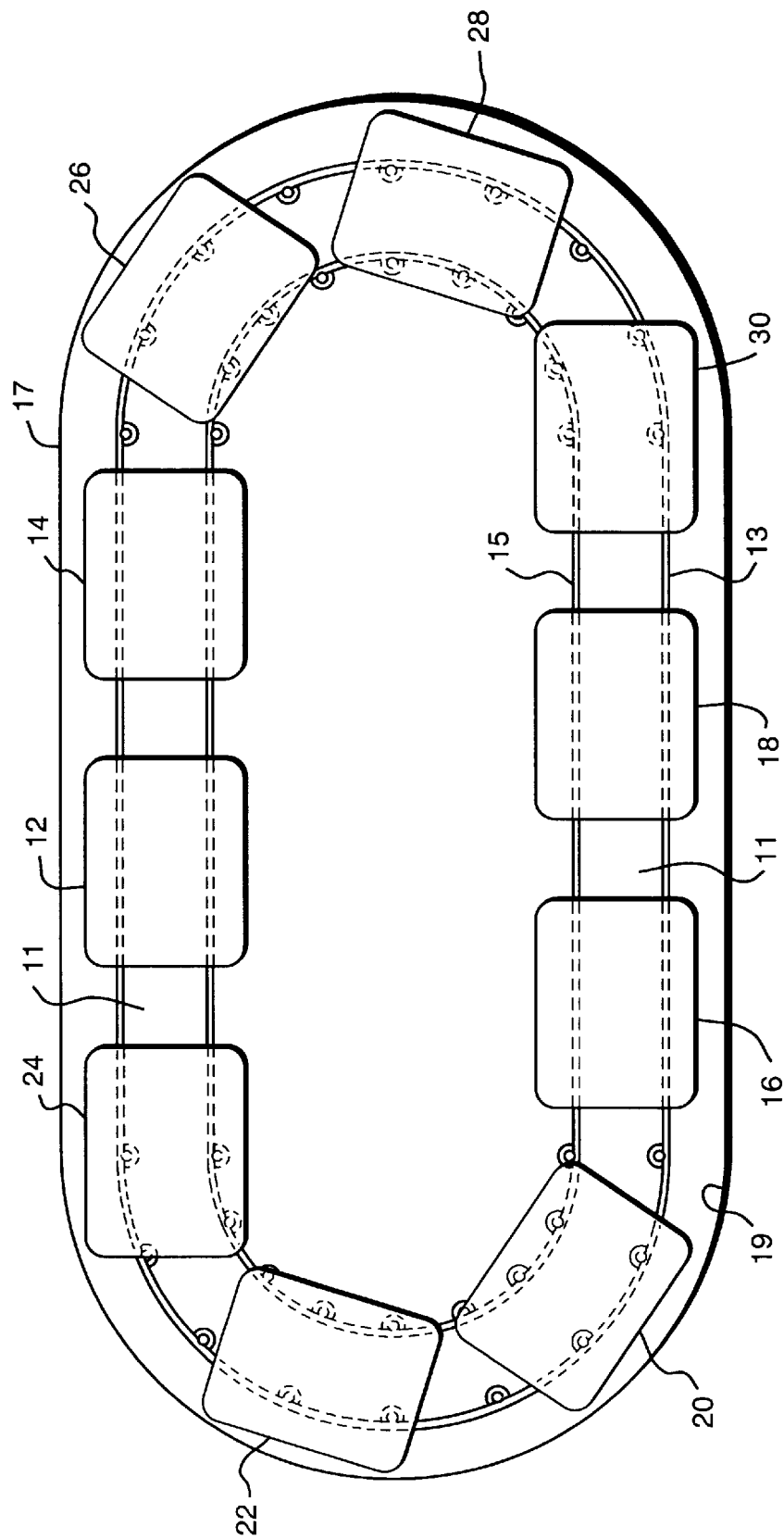
FIG. 1 is a top plan schematic view of a conveyor system built in accordance with the present invention.

In the schematic top plan view of FIG. 1, there may be seen a conveyor having a bed 11 on which closed loop cables 13 and 15 travel. The preferred cables are of ½" diameter polyurethane, sometimes referred to as round, polycord belts.

Resting on the cables 13 and 15 are ten trays. As shown, four of the trays 12, 14, 16, and 18 are wholly in the straight or lateral areas of the conveyor bed, and six of the trays 20, 22, 24, 26, 28, and 30 are in the curved end areas of the conveyor. The trays are carried by the cables past work stations such as 41, 43, 45, and 47.

Mounted on the conveyor bed adjacent the curved ends are guides 50, 52, 54, and 56. Assuming the trays are carried in a clockwise direction by the cables 13 and 15 on which they rest, at the right-hand end of the conveyor as shown, trays such as the tray 26 encounter the guide 17 which causes them to turn to the right and follow the oval path traversed by the cables. Similarly, trays such as the tray 16 as it enters the curved area at the left of the conveyor encounter the guide 19 which causes them to turn to the right and follow the oval path. The cables 13 and 15 are driven in a clockwise direction by a drive motor shown and described in greater detail hereinbelow. The cables 13 and 15 are maintained in their oval path by a plurality of mini-sheaves about which they pass, also as explained in greater detail hereinbelow. The conveyor is shown having a simple oval configuration, but it is to be understood that it may be straight or may include long or short curved sections operating on the same principles, namely with guides to maintain the trays in their desired paths and mini-sheaves to retain the cables in their proper paths.

Figure 2:
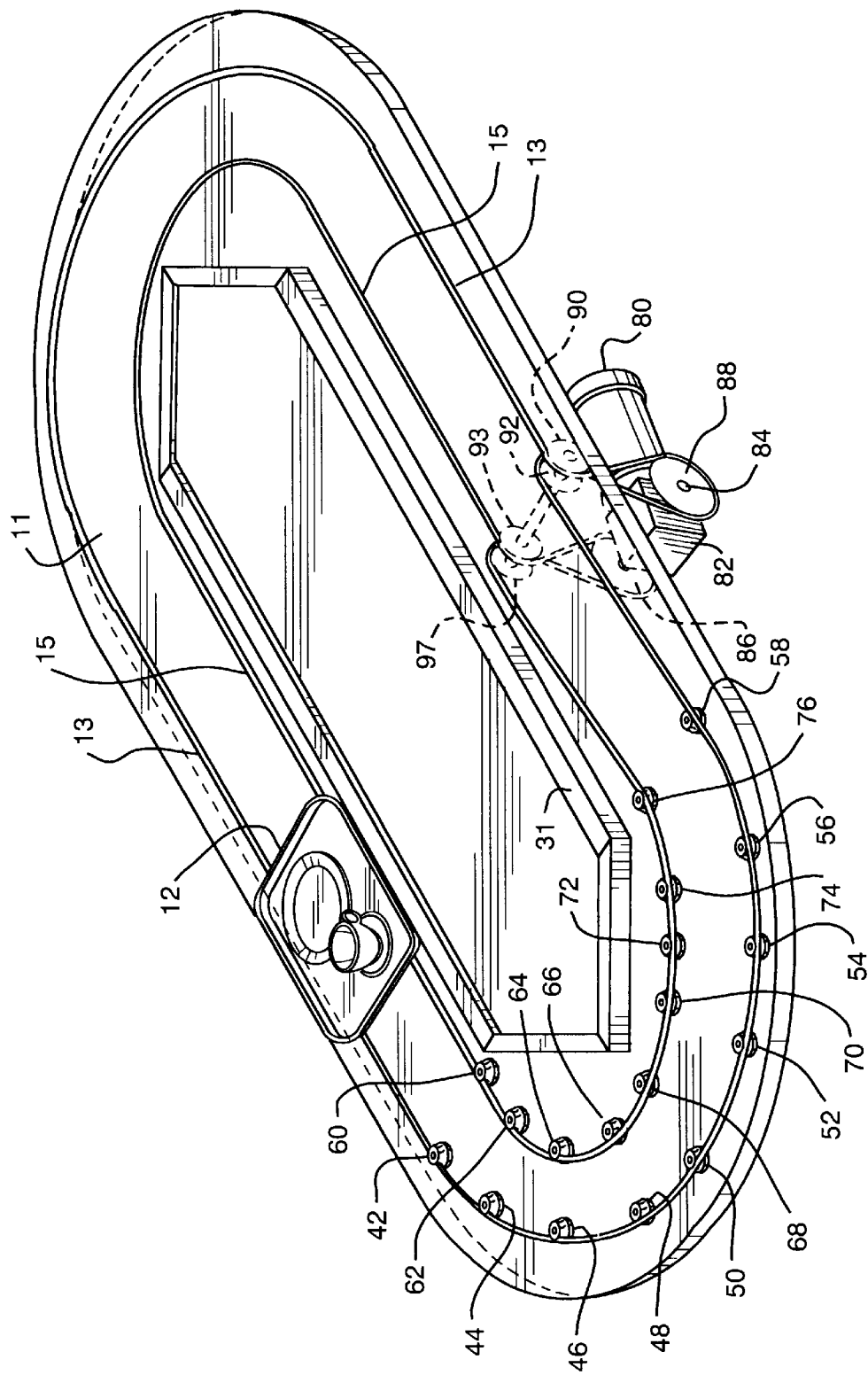
FIG. 2 is a top view in perspective of a conveyor system in which the drive system and cornering arrangement are highlighted.

The perspective view of FIG. 2 illustrates partially in outline and diagrammatically a conveyor system in which a preferred corner turn arrangement is employed. Also seen in FIG. 2 in outline is a drive system for the conveyor which eliminates the gap normally found adjacent the drive system in such conveyor systems. Mounted on a central frame 31 is a conveyor bed 11, which may be made of stainless steel. The conveyor bed 11 is oval in configuration and it is traversed by trays of which the tray 12 is typical. The trays are supported by twin polycord belts 13 and 15 which travel along the bed 11 in a horizontal plane and turn the ends of the oval by passing around a series of mini-sheaves. The upper flanges of the mini-sheaves are reduced in diameter, allowing the cords to protrude slightly above the sheave or other guiding device and contact the bottom of the trays at all times. The mini-sheaves 42, 44, 46, 48, 50, 52, 54, 56, and 58 guide the cable 13 and the mini-sheaves 60, 62, 64, 66, 68, 70, 72, 74, and 76 similarly support and guide the polycord cable 15. Identical arrangements are made at the opposite end of the oval but are not shown for purposes of simplifying the drawing.

Drive for the polycord cables 13 and 15 is provided by a power unit 80 disposed beneath the conveyor bed. The power unit 80 drives a reducer 82 having an output shaft 84 on the outer ends of which the sheaves 86 and 88 are mounted. The cable 13 passes through the conveyor bed and over an idler sheave 90, thence around the drive sheave 88. The cable 13 then moves slightly inwardly to pass over an idler sheave 92 and through the conveyor bed to resume its travel along the bed. In like fashion, the cable 15 follows a similar figure-8 path over an idler sheave 93, thence around the drive sheave 86, and returns over an idler sheave 97, also passing through the conveyor bed.

Figure 3:
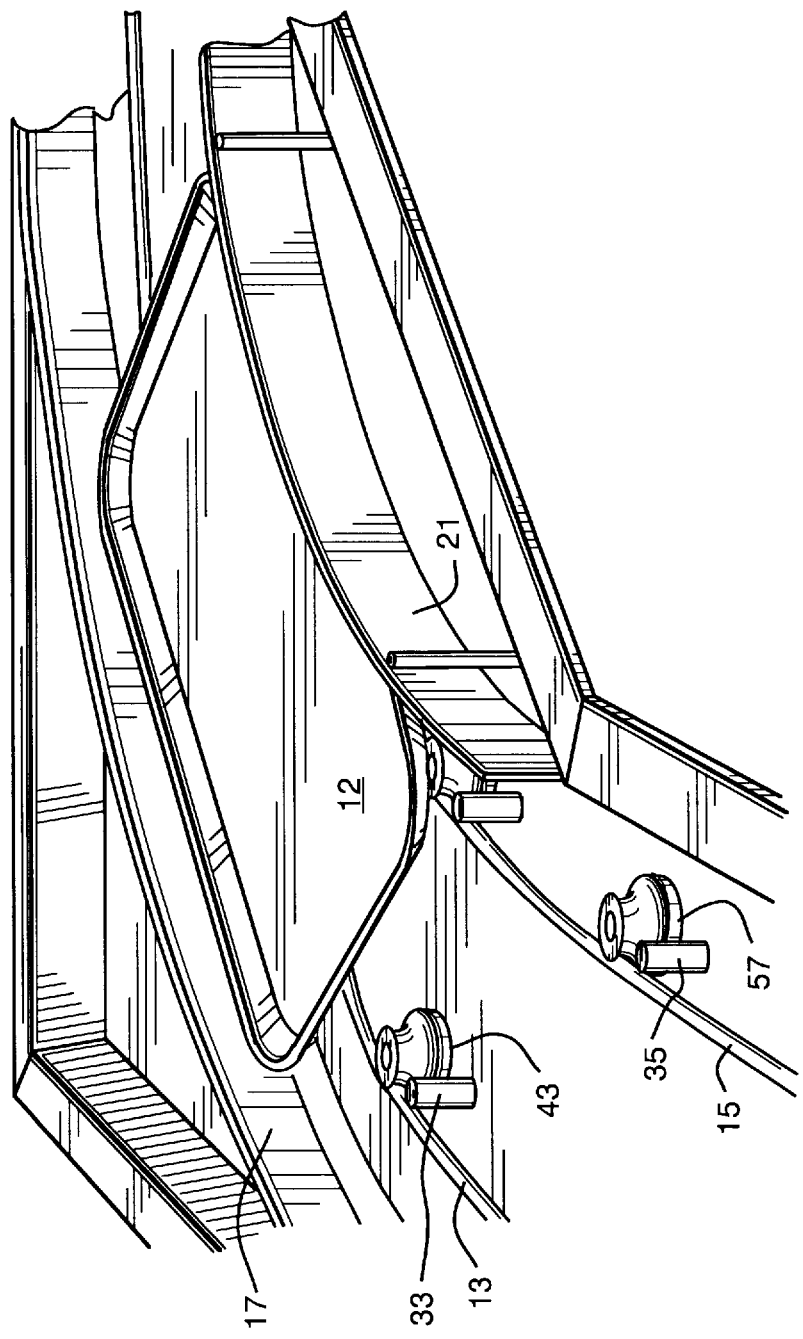
FIG. 3 is a detail view of a corner of the conveyor.

In FIG. 3, detail on a corner of the conveyor is shown. The cables 13 and 15 are shown as they make the turn about mini-sheaves 43 and 57 respectively. Each of the mini-sheaves will be seen to have a full-diameter flange, typically 2", at its lower end and a flange of reduced diameter, typically 1½", at its upper end. The height of the mini-sheave may be ⅞". The upper flange is sufficiently small that a ½" polycord cable carrier such as the cable 15 will extend above the upper flange and will be in contact with trays carried by the cables such as the tray 12. Anti-pinch posts 33 an 35 of ⅜" diameter may be provided with the mini-sheaves 43 and 57.

Also visible in this view is the outer arcuate guide 17 which is encountered by the tray in its travel, causing the tray to be forced to the right to follow the path set by the travelling cables. An inner tray guide 21, also of arcuate shape, may be provided to maintain the tray in the desired path.

Figure 4:
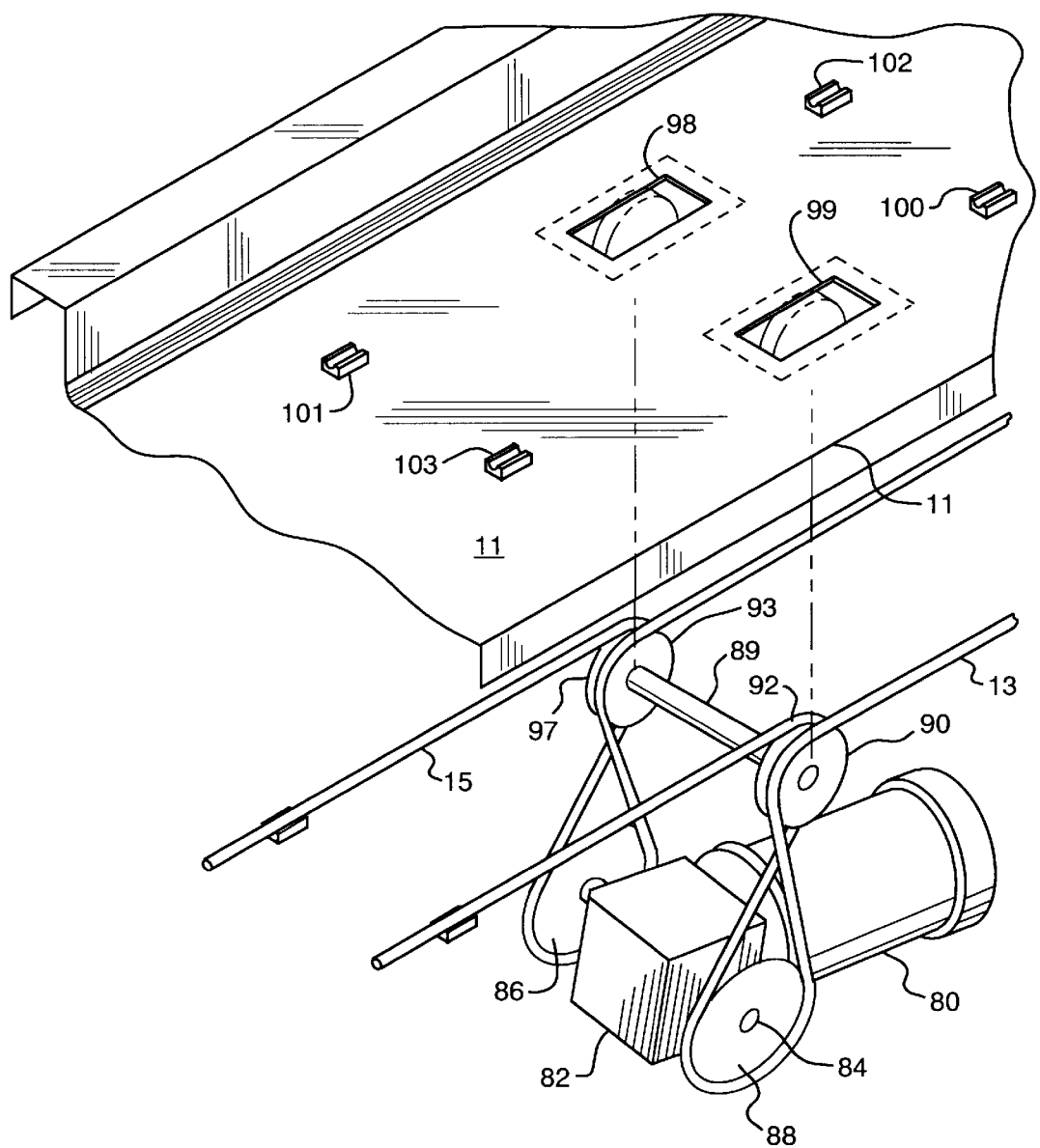
FIG. 4 is a schematic showing of a preferred drive system for the conveyor.

FIG. 4 is an enlarged view of the drive system shown in FIG. 2. In the drawing, the drive system is shown separated from the conveyor bed 11. The power unit 80 which is disposed beneath the conveyor bed has its axis X-X at a slight angle to the plane Y-Y of the path of the cable 13 on the conveyor bed. The power unit 80 drives a reducer 82 which has an output shaft 84 on the ends of which the drive sheaves 86 and 88 are mounted. A power transmission shaft 89 is mounted for rotation above the shaft 84 and rearwardly of the plane of the output drive shaft 84. That is, the plane of the shaft 89 is somewhat to the right of that of the drive output shaft 84 as shown in the drawing. Openings 98 and 99, which may be 2" by 4" are formed in the conveyor bed for the passage of the cables from above to below the conveyor bed. Also, guide blocks 101, 102, 103 and 104 made of grooved polyethylene may be mounted on the conveyor bed 11 to support the cables and reduce friction.

Mounted on the shaft 89 are four sheaves, 90, 92, 93 and 97. The sheaves 90 and 92 are spaced relatively closely and the cable 13 passes over the sheave 90, thence about the drive sheave 88 and thence around the output sheave 92.

Similarly, the sheaves 93 and 97 are relatively closely spaced. The cable 15 following a figure-8 path passes over the idler sheave 93, thence around the power drive sheave 86 and thence around the output sheave 97 which is spaced closely from the sheave 93 on the idler shaft 89. Because of the rearward disposition of the shaft 89 with respect to the power output shaft 84, no gap exists along the surfaces of the cables 13 and 15 with respect to the bottom surface of carrier trays on the cables. The drive motor 80, as noted, is so arranged so that its axis is at a slight angle to the path of the cables, compensating for the slight skewing of the cables which takes place as they follow their figure-8 paths and permitting common mounting of the spaced sheaves on the shaft 89. This totally eliminates any gap in contact between carriers and cables at the points of cable emergence at the conveyor bed.

What is claimed is:

1. In a conveyor system for transporting product carriers, including a conveyor bed and a pair of flexible cables arranged generally horizontally in parallel closed loops on said conveyor bed, said carriers resting on said cables, drive means for said cables disposed beneath said conveyor bed, said conveyor bed having openings formed therein for the passage of said cables therethrough, said cables following figure-8 paths in their travel through said openings between said conveyor bed and said driving means, the first cable of said pair being displaced from the second cable of said pair at their points of emergence through said conveyor bed whereby continuous contact between at least one of said cables and one of said carriers is maintained at all times, partially open-faced mini-sheaves having vertical axes and upper flanges of less diameter than the lower flanges thereof, whereby said cables extend above and contact the bottom surfaces of said product carriers, guide means adjacent said conveyor bed for contacting and guiding said carriers about predetermined paths, said mini-sheaves being rotatably mounted on said conveyor bed and restricting said cables to similar predetermined paths.

\* \* \* \* \*